April 2, 1935.                    J. R. POWER                    1,996,524
                              VOLTAGE REGULATOR
                              Filed May 22, 1934

INVENTOR
J. R. POWER
BY
Wayne B Wells
ATTORNEY

Patented Apr. 2, 1935

1,996,524

UNITED STATES PATENT OFFICE 1,996,524

VOLTAGE REGULATOR

James R. Power, East Orange, N. J., assignor to Bell Telephone Laboratories, Incorporated, New York, N. Y., a corporation of New York Application May 22, 1934, Serial No. 726,946

9 Claims. (Cl. 175—363)

This invention relates to voltage regulators and particularly to voltage regulators of the magnetically controlled type.

One object of the invention is to provide a voltage regulator that shall have a saturated inductive reactor and an unsaturated inductive reactor controlled in an improved manner to maintain the voltage on a load circuit constant.

Another object of the invention is to provide a voltage regulator with an unsaturated inductive reactor having two series connected alternating current winding in aiding relation between an alternating current supply circuit and a load circuit and a saturated inductive reactor having an alternating current winding connected across the supply circuit with one terminal connected between the two alternating current windings of the unsaturated reactor that shall maintain the load circuit voltage constant irrespective of supply circuit voltage changes.

A further object of the invention is to provide a voltage regulator with an unsaturated inductive reactor having two alternating current windings connected in series between one side of a supply circuit and one side of a load circuit and a load compensating winding energized according to the load on the load circuit and a saturated inductive reactor having an alternating current winding connected across the supply circuit with one terminal connected between the two alternating current windings of the unsaturated reactor that shall maintain the load circuit voltage constant irrespective of change of voltage on the supply circuit or changes in load on the load circuit.

In many cases it is desirable to employ an alternating current voltage regulator or a regulated rectifier that shall be relatively small and compact and be substantially free from maintenance expense. The present invention which is illustrated by means of a regulated rectifier and by means of an alternating current voltage regulator comprises a saturated inductive reactor and an unsaturated inductive reactor. The unsaturated reactor and the saturated reactor are so connected between an alternating current supply and the load as to maintain the load circuit voltage constant irrespective of load changes or voltage changes on the supply circuit.

In a regulated rectifier constructed in accordance with the invention, an unsaturated inductive reactor comprising a three legged core member having two alternating current windings distributed on the outside core legs and a direct current winding mounted on the central leg is combined with a saturated inductive reactor comprising a core member having an alternating current winding mounted thereon. The two alternating current windings of the unsaturated reactor are series connected in aiding relation between one side of the supply circuit and one side of the rectifier input circuit. The alternating current winding of the saturated inductive reactor is connected across the supply circuit and the input circuit of the rectifier with one terminal of this winding connected to the common terminal of the two alternating current windings on the unsaturated inductive reactor. The direct current winding of the unsaturated inductive reactor is energized from the rectifier output circuit to compensate the regulating operation according to the load on the load circuit. When the unsaturated inductive reactor and the saturated inductive reactor are connected between the supply circuit and the rectifier as above set forth, the voltage on the rectifier output circuit is compensated not only for load changes but also for change in the voltage of the supply circuit.

In an alternating current voltage regulator constructed in accordance with the invention, the load rectifier is dispensed with and a small rectifier, for example, a copper oxide rectifier, is connected across an impedance in the alternating current load circuit for energizing the direct current winding of the unsaturated reactor according to the load on the load circuit. The alternating current windings of the saturated and unsaturated inductive reactors are connected between the supply circuit and the load circuit in the same manner as these windings are connected between the supply circuit and the input circuit of the rectifier in the regulated rectifier circuit.

The regulated rectifier and the alternating current voltage regulator are modifications of the regulated rectifier disclosed in the application of H. M. Stoller, Serial No. 655,063, filed February 3, 1933. The improvements on the regulated rectifier disclosed in the application of J. R. Power, Serial No. 706,010 dated January 10, 1934 may be applied to the present invention.

In the accompanying drawing, Figure 1 is a diagrammatic view of a regulated rectifier constructed in accordance with the invention;

Figure 1:
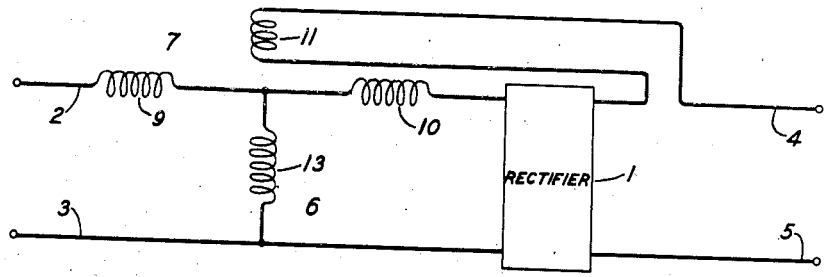
Figure 3:
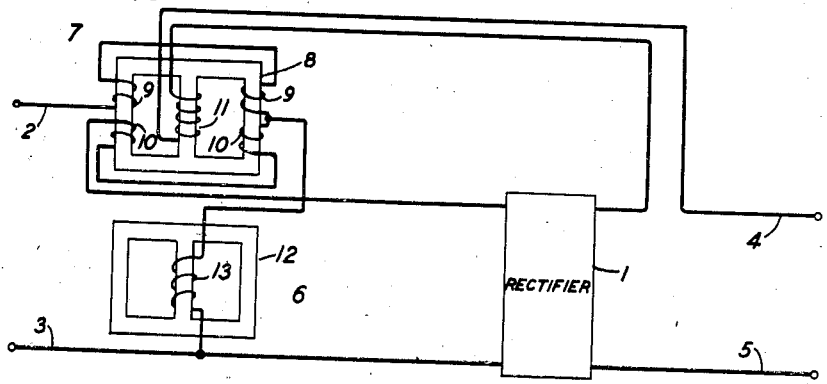
Fig. 3 is a diagrammatic view of the regulated rectifier shown in Fig. 1 with the saturated and unsaturated inductive reactors illustrated more in detail.

Referring to Figs. 1 and 3 of the drawing, a rectifier 1 is shown connected to a supply circuit comprising conductors 2 and 3 for supplying rectified current to a load circuit comprising conductors 4 and 5. The rectifier 1 may be of any suitable type. The input circuit of the rectifier 1 is connected to the alternating current supply conductors 2 and 3 by means of a saturated inductive reactor 6 and an unsaturated inductive reactor 7.

The unsaturated inductive reactor 7 comprises a three legged core member 8 having two alternating current windings 9 and 10 distributed on the outside core legs and a direct current winding 11 mounted on the central core leg. The two alternating current windings 9 and 10 are connected in series-aiding relation so that the flux in the outside core legs produced by one alternating current winding adds to the flux produced by the other alternating current winding. These two alternating current windings are connected in series relation between the supply conductor 2 and one side of the rectifier input circuit. In operation, the two alternating current windings serve as retard coils. The direct current winding 11 is connected in the output circuit of the rectifier 1 in order to vary the degree of saturation of the unsaturated reactor to compensate for variations in the load upon the rectifier.

The saturated reactor 6 comprises a three legged core member 12 having an alternating current winding 13 mounted upon the central leg thereof. The alternating current winding of the saturated inductive reactor is connected across the supply conductors 2 and 3 and across the input circuit of the rectifier with one terminal connected to the common terminal of the alternating current windings 9 and 10 mounted on the unsaturated inductive reactor. The winding 13 serves to absorb any increase in current caused by an increase in voltage across the supply conductors.

Assuming the voltage across the supply conductors 2 and 3 to be raised above normal, the voltage across the alternating current windings of the saturated reactor and the unsaturated reactor will be raised. The voltage across the windings 9 and 13 is increased according to the increase in the line voltage. At the same time, the current flow through the windings 9 and 13 will be increased. The voltage across the winding 10 is raised by transformer action from the increased voltage in winding 9. The winding 13 is so constructed as to have the same increase in current flow therethrough as the winding 9 and to absorb the increased current flow. The winding 10 opposes the voltage of the winding 13 and serves to prevent any increased flow in the current supplied to the rectifier 1. By such means the voltage on the load circuit is compensated for variations in the voltage on the alternating current supply circuit. The direct current winding 11, as above set forth, varies the degree of saturation of the unsaturated reactor 7 to compensate for variations in the load on the load circuit.

Figure 4:
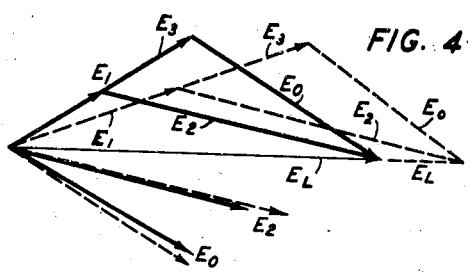
Fig. 4 is a vector diagram showing the relation of the voltages across the various reactor windings with respect to the supply circuit voltage and the load circuit voltage.

Referring to Fig. 4 of the drawing, a vector diagram is shown illustrating the relation of the voltages across the various windings of the inductive reactors. According to Kirchoff's law we have $$E_L = E_1 + E_2 \qquad (1)$$

where $E_L$ is the voltage across the supply conductors 2 and 3; $E_1$ is the voltage across the winding 9; $E_2$ is the voltage across the winding 13; $E_3$ is the voltage across the winding 10; and $E_0$ is the voltage across the rectifier input circuit. Moreover $$E_L = E_1 + E_3 + E_0 \qquad (2)$$

The vector diagram shown in Fig. 4 is constructed by means of the above two Equations (1) and (2). In the vector diagram the heavy lines indicate the condition for low supply circuit voltage and the light dotted lines indicate the conditions for high supply circuit voltage. A triangle is formed according to Equation (1) with the voltages across the supply circuit and windings 9 and 13. The vector $E_3$ is then added to the vector $E_1$ and a triangle formed with the supply circuit voltage vector to obtain the load circuit voltage $E_0$. This procedure is followed for both high and low supply circuit voltages. It will be noted that where the supply circuit voltage $E_L$ increases a certain amount, the voltages $E_1$, $E_2$ and $E_3$ all increase by approximately equal amounts and approximately one-half the increase in the supply circuit voltage $E_L$. This alters the size and angles of the voltage diagram in such manner that the load voltage $E_0$ remains constant in magnitude. In the preferred form, the voltages $E_1$ and $E_3$ are equal.

Figure 5:
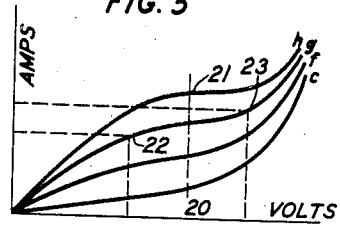
Fig. 5 is a set of curves illustrating the operation of the unsaturated inductive reactor.

Referring to Fig. 5 of the drawing, a set of curves is drawn to illustrate the operation of the unsaturated inductor reactor 7. The ordinates of the curves represent the amperes of current flow through the alternating current winding 9 and the abscissae represent the voltage across each of the coils 9 and 10. When operated at constant supply circuit voltage and with a variable load, the operating range is along the dotted line 20, 21 or along the line parallel to it for a different supply circuit voltage. When operating on constant load but with a variable supply circuit voltage the operating range is along one of the curves $e$, $f$, $g$ and $h$ as, for example, between 22 and 23 on the curve $g$. In the event of simultaneous variations in load and supply circuit voltage the operating range is the resultant combination. The operating range along the curves $e$, $f$, $g$ and $h$ as shown in Fig. 5 indicates a variation in the current flow. The change in the current flow must be accompanied by a change in the current flow through the saturated reactor of such magnitude that the current through the winding 10 remains constant. However, by the use of a three legged inductive reactor as shown in Fig. 3 of the drawing, it is possible to reduce the amount of current change and therefore to permit a reduction in the size of the saturated reactor.

Figure 2:
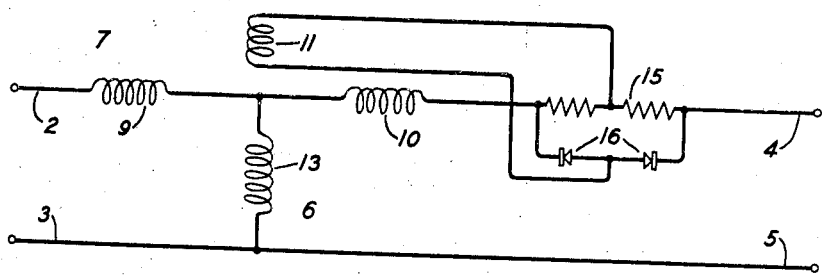
Fig. 2 is a diagrammatic view of an alternating current voltage regulator constructed in accordance with the invention.

Referring to Fig. 2 of the drawing, an alternating current voltage regulator is shown constructed in accordance with the invention. The regulator shown in Fig. 2 of the drawing is very similar to the regulated rectifier shown in Figs. 1 and 3 of the drawing and like parts will be indicated by similar reference characters. The load rectifier 1 shown in Fig. 1 is dispensed with in the alternating current regulator shown in Fig. 2 of the drawing. However, smaller rectifiers 16, preferably of the copper oxide type, are connected across an impedance 15 in the load circuit for energizing the direct current winding 11 of the unsaturated reactor 7 according to the load on the load circuit. The alternating current windings 9 and 10 of the unsaturated inductive reactor 7 and the alternating current winding 13 of the saturated inductive winding 6 are connected between the alternating current supply circuit and the load circuit in the same manner as these windings are connected in the regulated rectifier shown in Figs. 1 and 3. The operation of the unsaturated inductive reactor and the saturated inductive reactor is the same as described above in connection with the regulated rectifier shown in Figs. 1 and 3.

Modifications in the circuits and in the arrangement and location of parts may be made within the spirit and scope of the invention and such modifications are intended to be covered by the appended claims.

What is claimed is:

1. In combination, an alternating current supply circuit, a load circuit connected to said supply circuit, a saturated inductive reactor and an unsaturated inductive reactor compensating for supply circuit voltage changes, two alternating current windings on said unsaturated reactor connected in series aiding relation between the load circuit and said supply circuit, a winding on said saturated reactor connected across the supply circuit with one terminal connected between the two alternating current windings of the unsaturated reactor, a direct current winding on said unsaturated reactor, and means for energizing said direct current winding according to the load on the load circuit to compensate for load changes.

2. In a voltage regulator between an alternating current supply circuit and a load circuit, a saturated inductive reactor and an unsaturated inductive reactor for connecting the load circuit to the supply circuit and for maintaining the load circuit voltage constant, two alternating current windings on said unsaturated inductive reactor which are series connected between said supply circuit and said load circuit, an alternating current winding on said saturated reactor connected across the supply and load circuits so that with supply circuit voltage changes the voltage across the windings of said reactors changes, the rate of change of the current in the winding of the saturated reactor is of such magnitude that it absorbs the change of the current in the unsaturated reactor winding adjacent the supply circuit and the current in the unsaturated reactor winding adjacent the load circuit is held constant to hold the load circuit voltage constant, a direct current winding on said unsaturated winding, and means for energizing said direct current winding according to the load on the load circuit to compensate for load changes.

3. In a voltage regulator between an alternating current supply circuit and a load circuit, a saturated inductive reactor and an unsaturated inductive reactor between the load circuit and the supply circuit for compensating the load circuit voltage for supply circuit voltage changes, two alternating current windings on said unsaturated reactor conductively connected in series aiding relation between the supply circuit and the load circuit, an alternating current winding on said saturated reactor connected across the supply circuit with one terminal thereof connected to the common terminal of the two alternating current windings on the unsaturated reactor, a direct current winding on said unsaturated reactor, and means for energizing said direct current winding with direct current according to the load on the load circuit.

4. In a voltage regulator between an alternating current supply circuit and a load circuit, a saturated inductive reactor and an unsaturated inductive reactor between the load circuit and the supply circuit compensating for supply circuit voltage changes, said unsaturated reactor comprising a three legged core member carrying two alternating windings on the outside legs and a direct current winding on the central leg, the alternating current windings of the unsaturated reactor being series connected between the supply circuit and the load circuit, an alternating current winding on said saturated reactor connected across the supply circuit and the load circuit with one terminal thereof connected to the common connection of the two alternating windings on the unsaturated reactor, and means for energizing the direct current winding of the unsaturated reactor with direct current according to the load on the load circuit.

5. In a voltage regulator between an alternating current supply circuit and an alternating current load circuit, an unsaturated inductive reactor having two alternating current windings connected in series between one side of the supply circuit and one side of the load circuit, a saturated inductive reactor having an alternating current winding connected from the common connection of the two alternating current windings on the unsaturated reactor to the opposite side of the supply circuit and the load circuit, the alternating current winding of the unsaturated reactor adjacent the load circuit opposing the voltage generated by the alternating current winding of the saturated reactor, and a direct current winding on said unsaturated reactor energized according to the load on the load circuit.

6. In a voltage regulator between an alternating current supply circuit and an alternating current load circuit, an unsaturated inductive reactor comprising two windings in the form of retard windings connected between one side of the supply circuit and one side of the load circuit, a saturated inductive reactor having an alternating current winding connected across the supply circuit and the load circuit with one terminal thereof connected between the two alternating current windings on the unsaturated reactor, the alternating current windings on said reactors being so adjusted that as the supply circuit voltage changes the voltages across said windings change, the rate of change of the current in the winding of the saturated reactor is of such magnitude that it absorbs the change of the current in the winding of the unsaturated reactor adjacent the supply circuit and the load circuit voltage is held constant, a direct current winding on said unsaturated reactor, and means for energizing said direct current winding with direct current according to the load on the load circuit to compensate for load circuit changes.

7. In a voltage regulator between an alternating current supply circuit and an alternating current load circuit, an unsaturated inductive reactor having two windings connected in series aiding relation between the supply circuit and the load circuit, a saturated inductive reactor, a winding on said saturated reactor connected across the load and supply circuits with one terminal thereof connected between the two alternating current windings on the unsaturated reactor, a direct current winding on said unsaturated reactor, and means comprising a rectifier for energizing said direct current winding according to the load on the load circuit to compensate for changes in load.

8. In a voltage regulator, an alternating current supply circuit, a rectifier having an input circuit connected to said supply circuit for supplying rectified current to a load circuit, an unsaturated reactor having two alternating current windings connected in series between one side of the supply circuit and one side of the rectifier input circuit, a saturated reactor having an alternating current winding connected from the common connection of the two alternating current windings on the unsaturated reactor to the opposite side of the supply circuit and the input circuit of the rectifier, the alternating current winding of the unsaturated reactor adjacent the rectifier opposing the voltage generated by the alternating current winding of the saturated reactor, and a direct current winding on said unsaturated reactor energized according to the load on the load circuit.

9. In a voltage regulator, an alternating current supply circuit, a rectifier having an input circuit connected to said supply circuit for supplying rectified current to a load circuit, a saturated inductive reactor and an unsaturated inductive reactor for connecting the rectifier input circuit to the supply circuit and for maintaining the load circuit voltage constant, said unsaturated reactor comprising a three legged core member, two alternating current windings on the outside core legs and a direct current winding on the central core leg, said saturated reactor having an alternating current winding, the alternating current windings of said unsaturated reactor being connected in series between the supply circuit and said input circuit, the winding of the saturated reactor being connected across the supply circuit and the rectifier input circuit so that with supply circuit voltage changes the voltage across the alternating current windings of the reactors changes, the rate of change of the current in the winding of the saturated reactor is of a magnitude to absorb change of the current in the unsaturated reactor winding adjacent the supply circuit and the current in the unsaturated winding adjacent the rectifier input circuit is held constant to hold the load circuit voltage constant, and means for energizing the direct current winding of the unsaturated reactor from the load circuit to compensate for load changes.

JAMES R. POWER.